United States Patent
Lueck

(10) Patent No.: US 8,240,080 B1
(45) Date of Patent: *Aug. 14, 2012

(54) DOCK MOUNTED FISH LIVE BOX

(76) Inventor: Douglas A. Lueck, Norwood, MN (US)

( * ) Notice: Subject to any disclaimer, the term of this patent is extended or adjusted under 35 U.S.C. 154(b) by 141 days.

This patent is subject to a terminal disclaimer.

(21) Appl. No.: 12/460,092

(22) Filed: Jul. 14, 2009

Related U.S. Application Data

(63) Continuation-in-part of application No. 11/455,543, filed on Jun. 19, 2006, now Pat. No. 7,562,491.

(60) Provisional application No. 60/595,293, filed on Jun. 21, 2005.

(51) Int. Cl.
- *A01K 97/20* (2006.01)
- *A01K 97/04* (2006.01)
- *A01K 97/05* (2006.01)

(52) U.S. Cl. .......................................................... 43/55

(58) Field of Classification Search ................ 43/55, 56, 43/54.1, 44.99
See application file for complete search history.

(56) References Cited

U.S. PATENT DOCUMENTS

| | | | | |
|---|---|---|---|---|
| 268,558 A * | 12/1882 | Small | | 43/55 |
| 980,148 A * | 12/1910 | Garrard | | 43/55 |
| 1,439,878 A * | 12/1922 | Erhardt et al. | | 248/101 |
| 2,149,482 A * | 3/1939 | Whitaker | | 43/55 |
| 2,169,941 A * | 8/1939 | Campbell | | 43/55 |
| 2,530,148 A * | 11/1950 | Bjorklund et al. | | 43/55 |
| 2,591,891 A * | 4/1952 | Thorsen | | 43/55 |
| 2,715,293 A * | 8/1955 | Martin | | 43/55 |
| 2,780,887 A * | 2/1957 | Cabaniss | | 43/55 |
| 2,945,658 A * | 7/1960 | Hayslip | | 43/55 |
| 4,429,659 A * | 2/1984 | Holyoak | | 43/103 |
| 5,561,939 A * | 10/1996 | Wik | | 43/100 |
| 6,234,444 B1 * | 5/2001 | Haddad | | 248/545 |
| 6,267,079 B1 * | 7/2001 | Eby | | 43/100 |
| D451,675 S * | 12/2001 | Hardy et al. | | D3/306 |
| D462,737 S * | 9/2002 | Lipari | | D22/136 |
| D485,329 S * | 1/2004 | Haws | | D22/136 |
| D499,164 S * | 11/2004 | Lillard et al. | | D22/136 |
| 7,562,491 B1 * | 7/2009 | Lueck | | 43/55 |
| 2002/0083638 A1 * | 7/2002 | Cunningham, Sr. | | 43/54.1 |
| 2004/0231226 A1 * | 11/2004 | Yust et al. | | 43/55 |
| 2005/0039377 A1 * | 2/2005 | Clary | | 43/54.1 |

FOREIGN PATENT DOCUMENTS

| | | | |
|---|---|---|---|
| EP | 354640 A2 * | 2/1990 | |
| EP | 508808 A1 * | 10/1992 | |
| GB | 2241630 A * | 9/1991 | |
| GB | 2242812 A * | 10/1991 | |
| GB | 2271702 A * | 4/1994 | |
| GB | 2283158 A * | 5/1995 | |
| GB | 2301009 A * | 11/1996 | |
| GB | 2441955 A * | 3/2008 | |
| JP | 02255034 A * | 10/1990 | |
| JP | 10323151 A * | 12/1998 | |
| JP | 11155453 A * | 6/1999 | |
| JP | 2000125740 A * | 5/2000 | |
| JP | 2003052291 A * | 2/2003 | |
| JP | 2004321070 A * | 11/2004 | |

* cited by examiner

*Primary Examiner* — Darren W Ark
(74) *Attorney, Agent, or Firm* — Richard John Bartz

(57) ABSTRACT

A fish live box has a frame assembly supporting a mesh screen surrounding a chamber for accommodating fish. A minnow cage is located in the chamber. A top wall and door closes the top of the frame assembly. Brackets mount the fish live box to a dock. Upright legs mounted on the frame assembly are vertically adjustable to locate pads on the bottom of the legs on the bed of a body of water to support the fish live box on the bottom of a body of water.

29 Claims, 10 Drawing Sheets

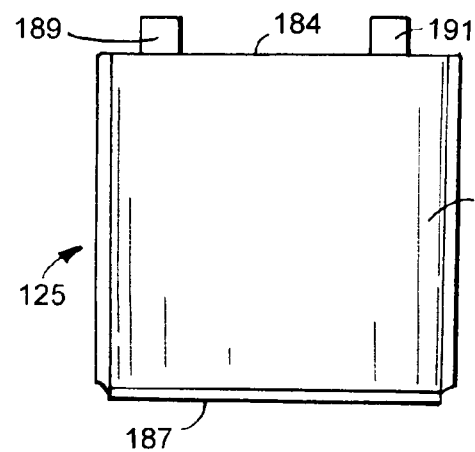
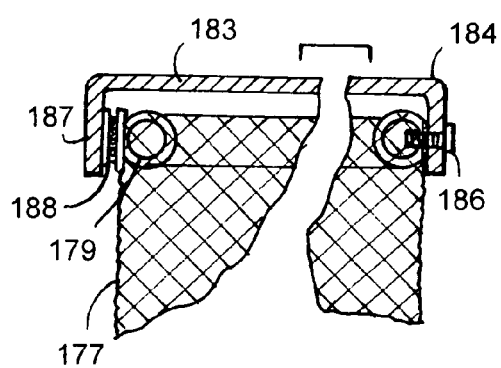
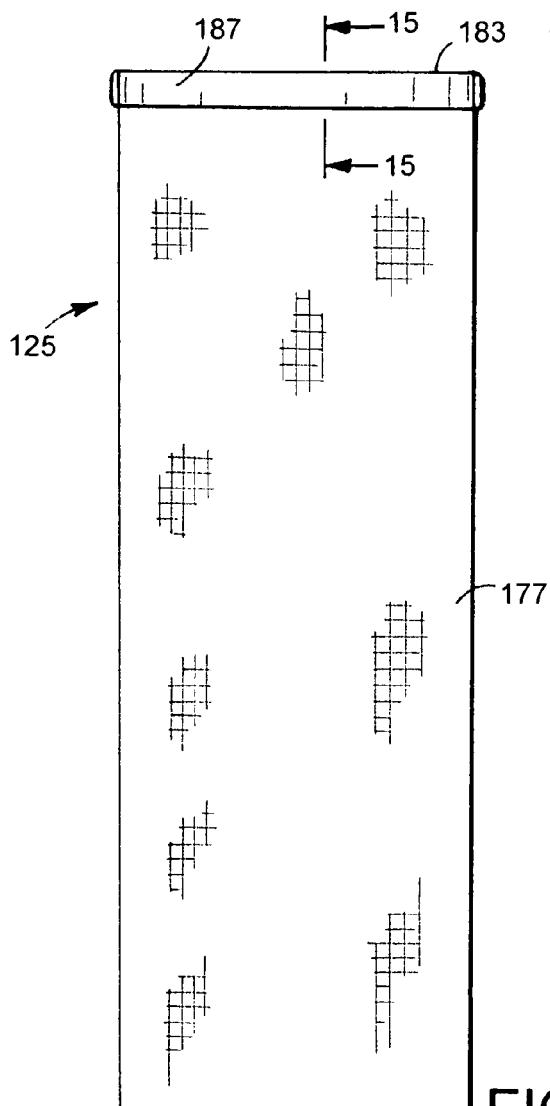

DOCK MOUNTED FISH LIVE BOX

CROSS REFERENCE TO RELATED APPLICATION

This application is a continuation-in-part of U.S. patent application Ser. No. 11/455,543 filed Jun. 19, 2006, now U.S. Pat. No. 7,562,491. Application Ser. No. 11/455,543 claims the priority benefit of U.S. Provisional Application Ser. No. 60/595,293 filed Jun. 21, 2005.

FIELD OF THE INVENTION

The invention relates to aquatic vertebrate and living matter holding structures. The holding structures comprise boxes connected to docks for holding live fish in a body of water.

BACKGROUND OF THE INVENTION

Floating fish baskets and live wells are used for fish caught alive for an extended period of time. Floating fish baskets have buoyant rings attached to nets to form holding areas for fish. Tether lines are used to secure the basket to a boat or dock. Examples of floating fish baskets are disclosed in U.S. Pat. Nos. 3,478,463; 3,919,803; D462,737; and D485,329. These fish baskets are portable structures that float on the surface of a body of water. Bass boats have live wells included in the structure of the boats supplied with aeration systems. Fish die quickly in these live wells because the aeration systems pull in warm surface water. A live well for accommodating fish having a portable container mounted in a boat is disclosed in U.S. Pat. No. 6,105,305. The container is a flexible bag with a well cavity for holding water. A plurality of cords attached to hooks releasably attach the bag to opposite gunwales of the boat. G. C. Hayslip in U.S. Pat. No. 2,945,658 discloses an upright post and a cylindrical locking member that attaches a conventional fish net to the post. The post is anchored to the bottom of a body of water. The post can be secured to a wharf or gunwale of a boat. The fish live box of the invention avoids the disadvantages of the prior fish baskets and fish live wells.

SUMMARY OF THE INVENTION

The invention comprises a fish live box mountable on a dock and supported with legs on the bottom of a body of water adjacent the dock. The fish retained in the water in the box are kept alive and healthy in a natural environment. The live box has a frame assembly having interconnected tubes providing support for a mesh screen. The screen surrounds the sides, ends and bottom of the frame assembly and defines a chamber accommodating water when placed in a body of water. Fasteners, such as loop ties, attach the mesh screen to the frame assembly. The top of the frame assembly supports a top wall connected to a door with a hinge allowing the door to be moved to open and closed positions relative to the open top of the frame assembly. The outer side of the frame assembly is supported and stabilized on the bed of the body of water with upright legs attached with clamps to the frame assembly. The clamps have adjustable fasteners that allow the legs to be adjusted up and down to accommodate the depth of the water adjacent to the dock. Pads on the lower ends of the legs rest on the bed of the body of water to support the box on the bed. Tube extensions coupled to the legs are used to compensate for water depth. The invention includes the combination of a dock extended over a body of water, such as a lake, pond, or river, and a box located in the body of water for holding live fish. The box has an internal chamber accommodating water and fish. Brackets connect the inside of the box to the dock. At least one upright leg connected to the outside of the box supports the box on the bed of the body of water. The leg has a lower end extended downward into the water and engageable with the bed of the body of water to support and stabilize the box on the bed. The preferred embodiment of the box holding the apparatus has two brackets connected to the box and two legs connected with adjustable clamps to the box. Generally flat pads secured to the lower ends of the legs rest on the bed to provide a firm support for the box on the bed. Extensions can be added to the legs to accommodate water depth. The fish live box is made of rust proof plastic parts and is sturdy in construction and easy to install with common hand tools. The fish live box fits most docks. Environmentally the fish live box allows fish to remain in the water of the body of water keeping the fish in a natural and deeper setting. There is a less stressful fish environment allowing easy release or cleaning for food. In another embodiment of the fish live box, a minnow cage is located in the interior chamber of the fish live box. The minnow cage has a mesh bag located around a cage frame connected to the frame assembly of the fish live box. A cover located over the top opening of the bag is movable between open and closed positions relative to the top opening of the bag. A live hinge secures one side of the cover to the cage frame whereby the cover can be manually moved between its open and closed positions.

DESCRIPTION OF THE DRAWINGS

FIG. 13 is an enlarged top plan view of the minnow cage of FIG. 9;

FIG. 14 is a front elevational view of the minnow cage of FIG. 9;

FIG. 15 is an enlarged fragmentary sectional view taken along line 15-15 of FIG. 14;

DESCRIPTION OF THE INVENTION

Figure 1:
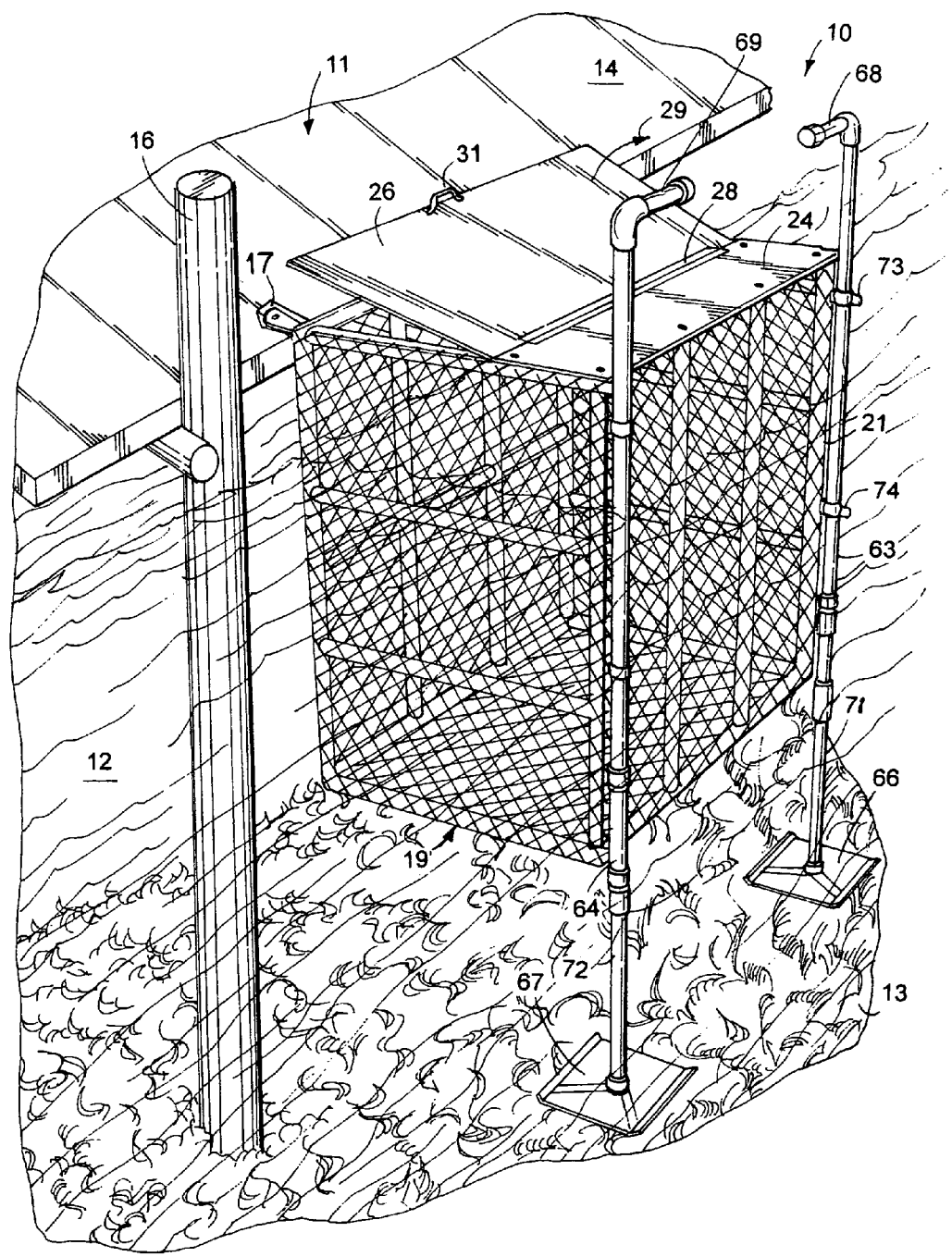
FIG. 1 is a perspective view of the dock mounted fish live box of the invention mounted on a dock extended over a body of water.

A fish live box 10 of the invention mounted on the side of a dock 11, shown in FIG. 1, extends downward into a body of water 12, such as a lake, pond or river, to retain fish in the water. Dock 11 is a conventional structure having a horizontal deck 14 extended over the surface of water 12 and anchored to the bottom or bed 13 of the body of water with upright posts 16. Other devices such as floats, can be used to support deck 14 on water 12. A pair of brackets 17 and 18 connect fish live box 10 to a side of deck 14. Fish live box 10 can be removed from brackets 17 and 18 to allow box 10 to be raised out of the water and placed in a storage location. Box 10 is not broken down or taken apart when it is removed from dock 11.

Figure 6:
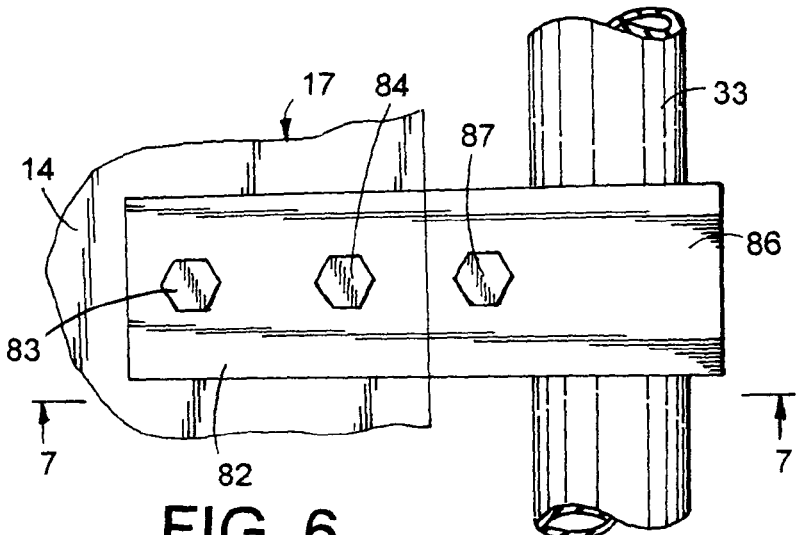
FIG. 6 is an enlarged top plain view of the bracket connecting the frame assembly of the fish live box to the dock.
Figure 7:
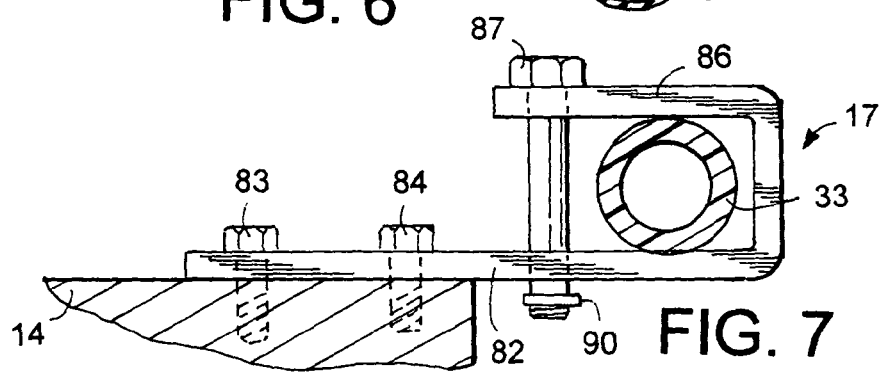
FIG. 7 is a sectional view taken along the line 7-7 of FIG. 6.

Bracket 17, shown in FIGS. 6 and 7, is a hook shaped member having a flat base 82 secured with fasteners 83 and 84 to deck 14, A lip 86 joined to base 82 extends around a top frame member 33 of box 10. A removable pin 87 extends through a hole in base 82 and lip 86 to hold frame member 33 in engagement with bracket 17. A spring key 90 located in the lower end of pin 87 retains pin 87 in a locked position on bracket 17. Key 90 can be removed from pin 87. Pin 87 can then be removed from base 82 and lip 86 to allow frame member 33 to be disconnected from bracket 17. Bracket 18 has the same structure as bracket 17.

The following description of live box 10 is directed to holding live fish and aquatic vertebrates. Live box 10 can be used to hold other aquatic organisms and plants. Box 10 is an aquatic cage to contain fish, water creatures, plants for research, breeding and raising and keeping fish for food.

Fish live box 10 has a frame assembly 19 supporting an open mesh screen 21 surrounding an internal chamber 22. Screen 21 is attached with plastic loop fasteners or ties 23 to the sides and bottom of frame assembly 19. The open top of frame assembly 19 is closed with a top wall 14 and lid or door 26. A transverse hinge 28 pivotally connects door 26 to top wall 24 to allow door 26 to swing, as shown by arrow 29, to open and closed positions. A handle 31 attached to an outer edge portion of door 26 is located adjacent deck 14 so that the angler can have easy access to live box 10. Top wall 24 and door 26 are rustproof plastic sheets that are environmentally compatible with water and sunlight. Top wall 24 and door 26 are solid panels that shade the water in box 10. Other materials, such as stainless steel, wood, and ceramics, can be used for top wall 24 and door 26.

Figure 5:
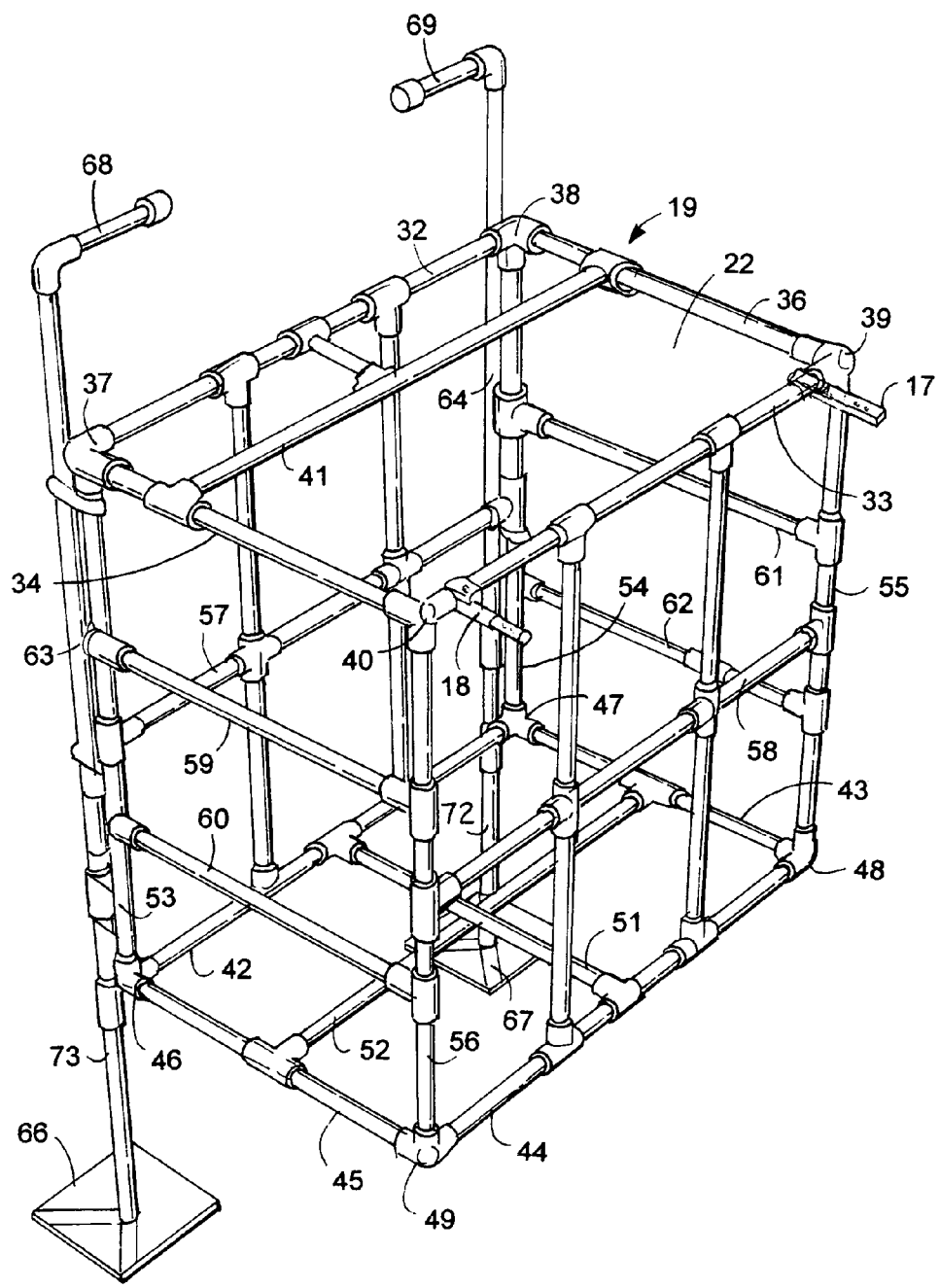
FIG. 5 is a perspective view of the frame assembly of the fish live box of FIG. 1.

As shown in FIG. 5, frame assembly 19 has top longitudinal frame members 32 and 33 connected to transverse or side frame members 34 and 36 with corner connectors 37, 38, 39, and 40. A longitudinal member 41 extended between and joined to members 34 and 36 provides support for top wall 24 and hinges 28. Bottom frame members 42, 43, 44, and 45 are connected to corner connectors 46, 47, 48, and 49 and cross members 51 and 52. Upright frame members 53, 54, 55 and 56 are connected to the corners of bottom frame members 42-45 to provide a rigid box frame assembly. Horizontal front and back members 57 and 58 extend between and are jointed to middle portions of upright corner members 53, 54, 55, and 56. End horizontal members 59, 60, 61, and 62 extend between and are jointed to corner members 53, 56 and 54, 55. The frame members are PVC tubes connected to PVC connectors to provide a rigid box frame assembly with a rectangular top opening. The connectors are conventional T, crossed and corner plastic tube components. The bottom corner connectors 46-49 have holes (not shown) that allow water into the tubular frame members or PVC tubes. The top corner connectors 37-40 have holes (not shown) to allow air to vent from the tubular frame members or PVC tubes to avoid flotation of frame assembly 19.

Figure 2:
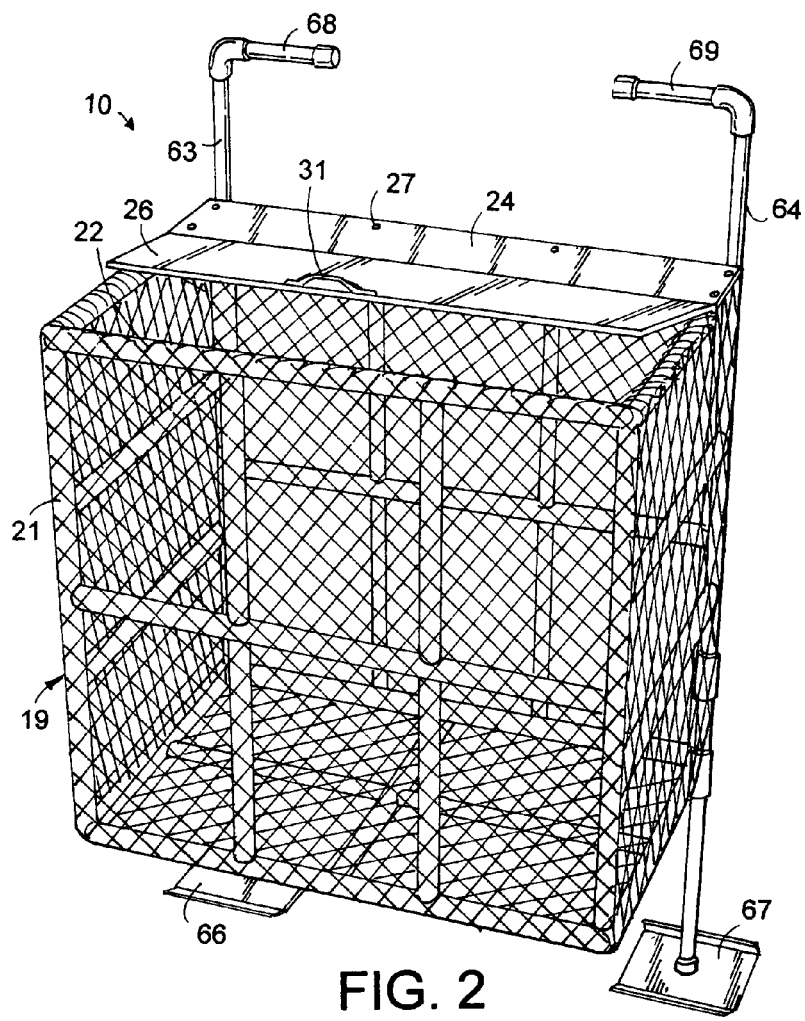
FIG. 2 is a front perspective view of the fish live box of FIG. 1.
Figure 3:
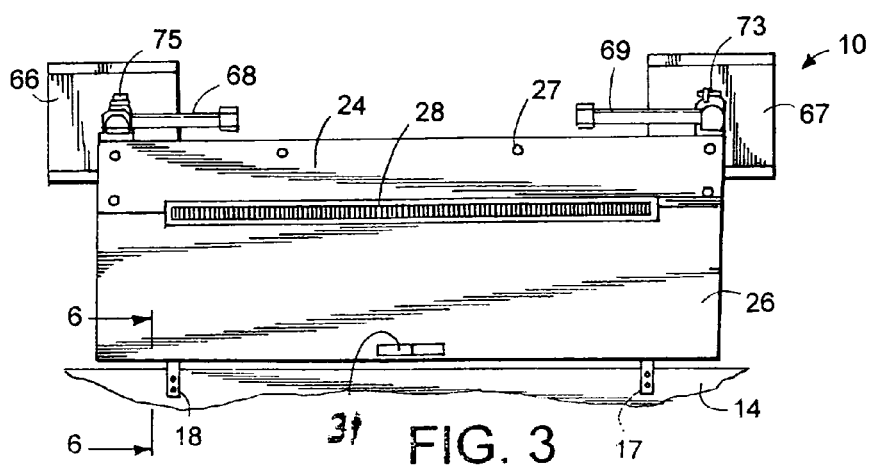
FIG. 3 is a top plain view thereof.
Figure 4:
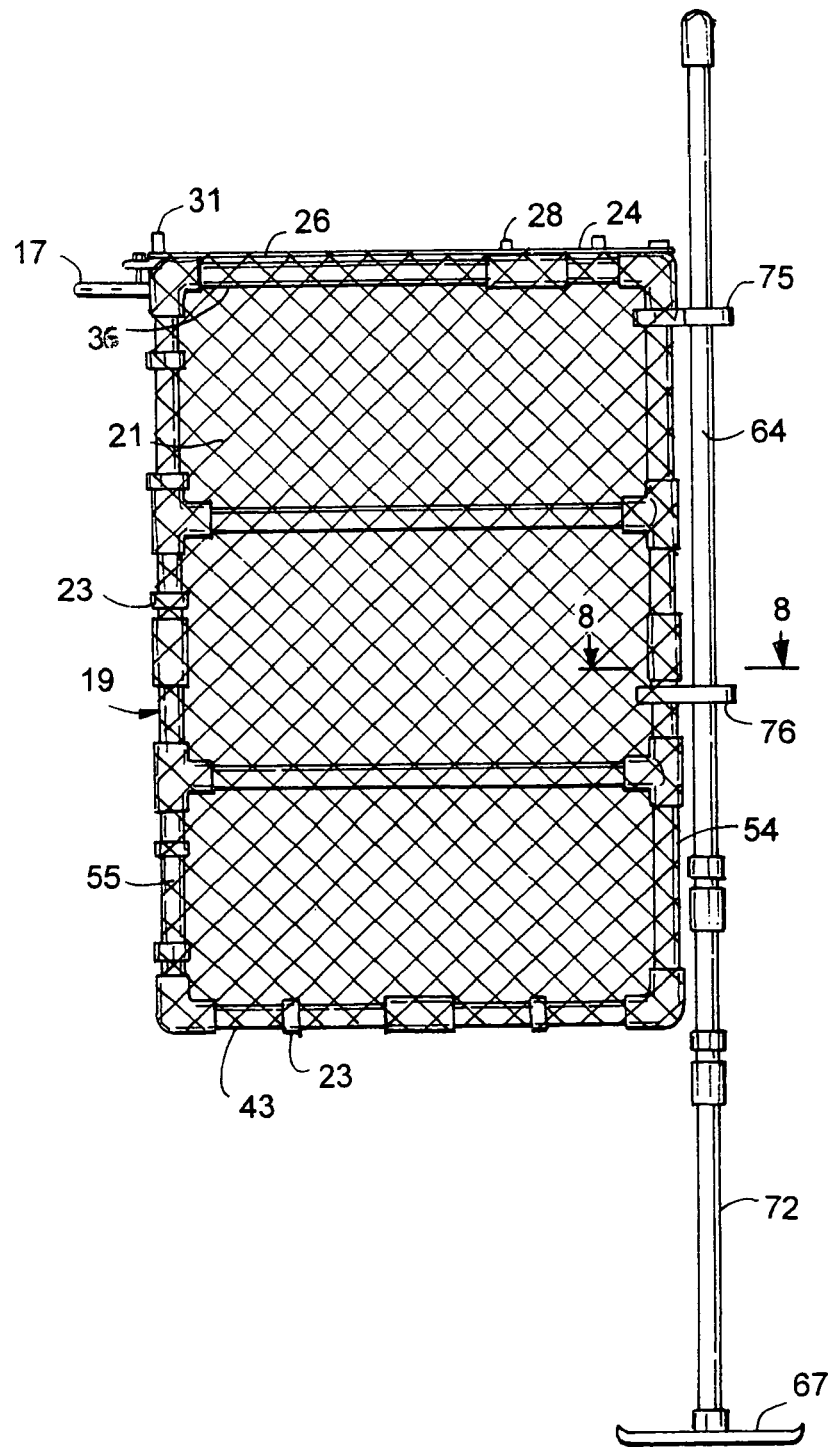
FIG. 4 is an enlarged side elevational view thereof.

As shown in FIGS. 1, 2, and 4, screen 21 extends around frame assembly 19. Loop fasteners or ties 23 secure screen 21 to all of the frame members. Screen 21 is a plastic mesh sheet member. An example of screen 21 is a ¾ inch mesh plastic screen. Other types of screens, such as nylon and wire screens and mesh sizes, can be used to enclose frame assembly 19.

Figure 8:
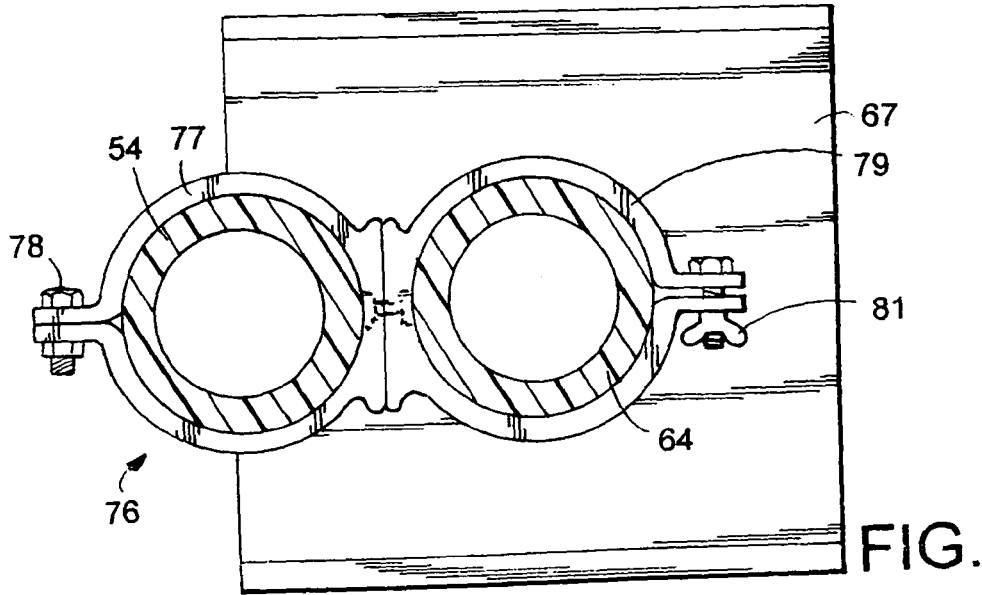
FIG. 8 is an enlarged sectional view taken along the line 8-8 of FIG. 4.

A pair of upright bars or legs 63 and 64 mounted on upright corner members 53 and 54 extend downward to bed 13 to support and stabilize the outside of frame assembly on bed 13. The bottom ends of legs 63 and 64 are connected to flat pads or feet 66 and 67 that rest on bed 13. An example of a pad is a 10 inch square plastic plate having an upright center sleeve attached to the bottom of a leg. The large bottom surface areas of pads 66 and 67 limit the sinking of legs 63 and 64 into the soil of bed 13 as shown in FIG. 1. The upper ends of legs 63 and 64 have inwardly directed arms 68 and 69 providing stops for door 26 and hand grips or handles for placing box 10 in the water adjacent dock 11, connecting frame assembly 19 to dock mounted brackets 17 and 18 and removing box 10 from the water and brackets 17 and 18. As shown in FIGS. 1, 4, and 5, legs 63 and 64 have lower extensions 71 and 72 to compensate for the depth of the water 12 adjacent dock 11 so that pads 66 and 67 are located in firm engagement with bed 13. Additional extensions or longer extensions for deep water applications can be joined to legs 63 and 64 to accommodate water depth adjacent dock 11. Legs 63 and 64 are connected to upright corner members 53 and 54 with clamps 73, 74, 75, and 76 which allow legs 63 and 64 to be vertically adjusted to ensure that pads 66 and 67 are supported on bed 13. Clamps 75-76 are identical connecting devices that allow legs 63 and 64 to be vertically adjusted relative to frame assembly 19. As shown in FIG. 8, clamp 76 has a first cylindrical portion or split ring 77 located around leg 54 and clamped thereon with a nail and bolt assembly 78. A second cylindrical portion or split ring 79 joined to the first cylindrical portion 77 surrounds leg 64 and clamped thereon with a bolt and wing nut assembly 81. Wing nut can be manually turned to release the clamping force of cylindrical portion 79 on leg 64 to allow leg 64 to be adjusted up or down to level box 10 adjacent the side of dock 11 and engage pad 67 with bed 13 of the lake.

Figure 9:
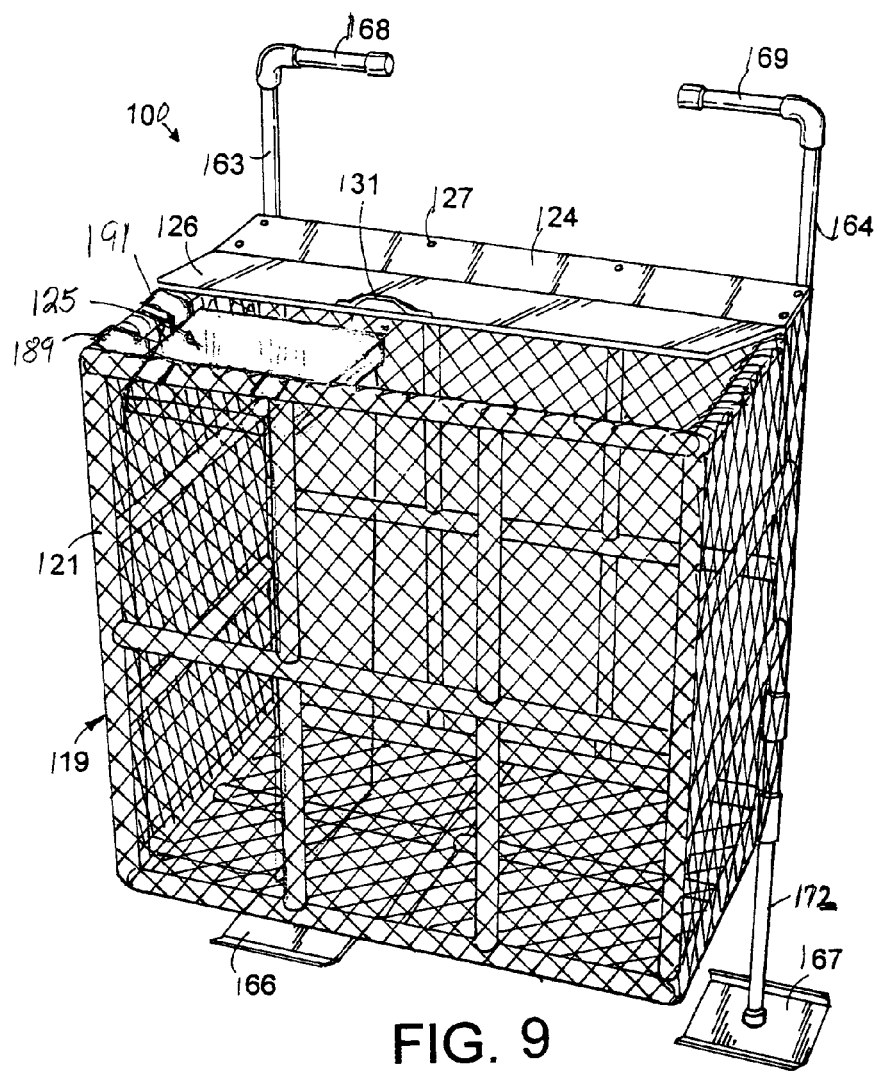
FIG. 9 is a perspective view of a modification of the dock mounted fish live box of the invention having a minnow cage therein.
Figure 10:
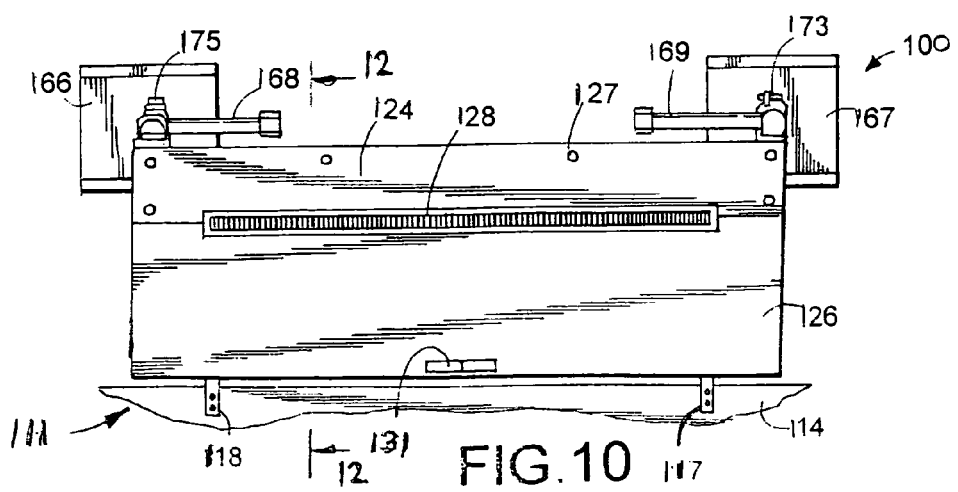
FIG. 10 is a top plan view of FIG. 9 showing the fish live box connected to a dock.

A modification of the fish live box 100, shown in FIGS. 9 and 10, releasably connected to a clock 111 and extended downward into a body of water, such as a lake, pond or river to retain fish and aquatic creatures in water. Dock 111 has a conventional generally horizontal platform or deck 114. The parts of fish live box 100 that correspond to the parts of fish box 10 have the same reference members with a prefix 1. The specification of fish live box 10 is incorporated in the following description of fish live box 100.

A pair of brackets 117 and 118 releasably connect fish live box 100 to one side or the end of deck 114. Brackets 117 and 118 allow fish live box 100 to be separated from deck 114 and raised out of the water and transported to a storage location or another dock. Fish live box 100 is not broken down or taken apart when it is separated from deck 114 or stored. An example of releasable brackets 117 and 118 are show in FIGS. 6 and 7 and described herein. Other types of releasable connectors and brackets can be used to secure fish live box 100 to deck 114 or other portions of dock 111.

Figure 11:
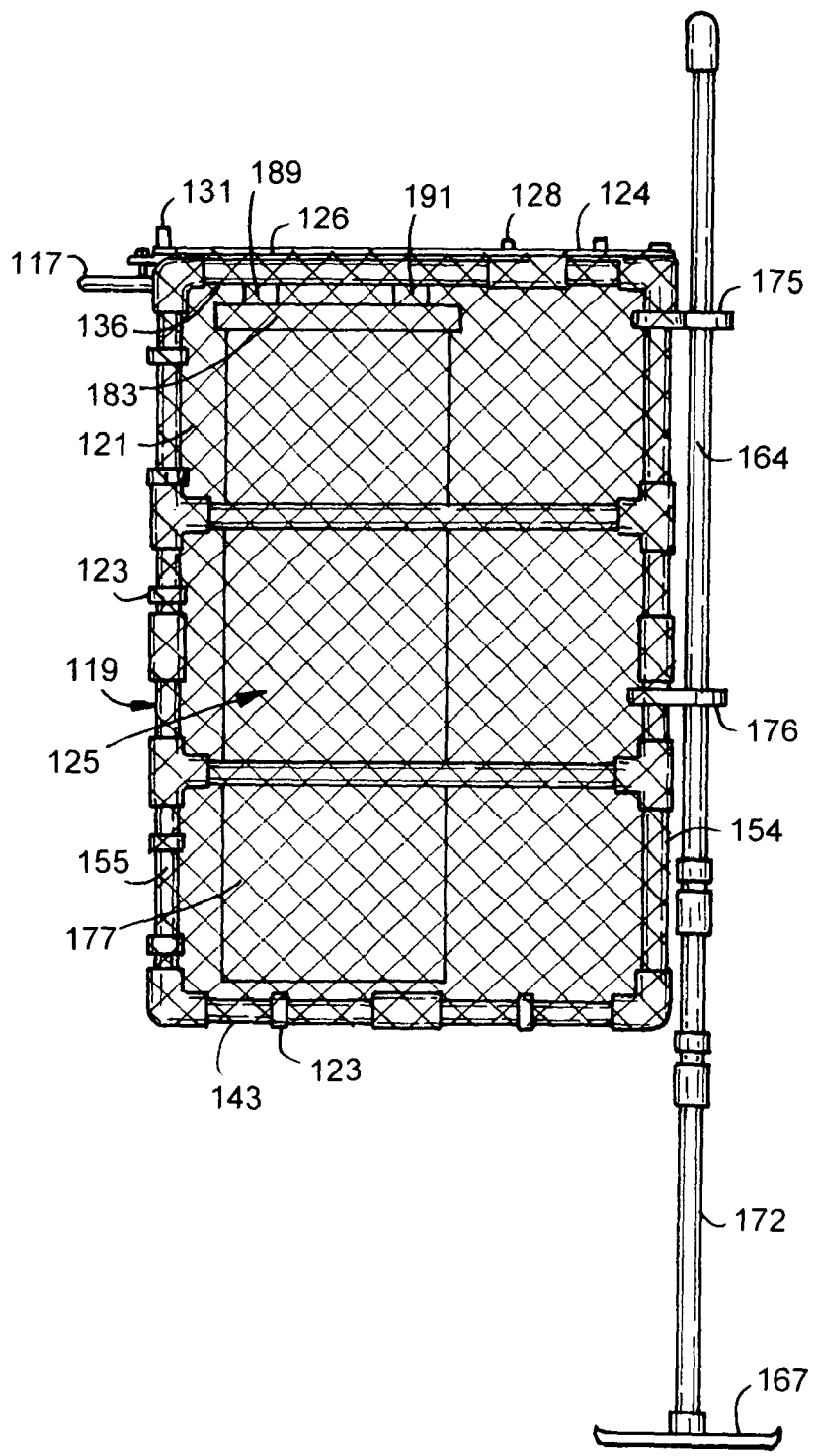
FIG. 11 is an enlarged side elevational view of the left side of FIG. 9.
Figure 12:
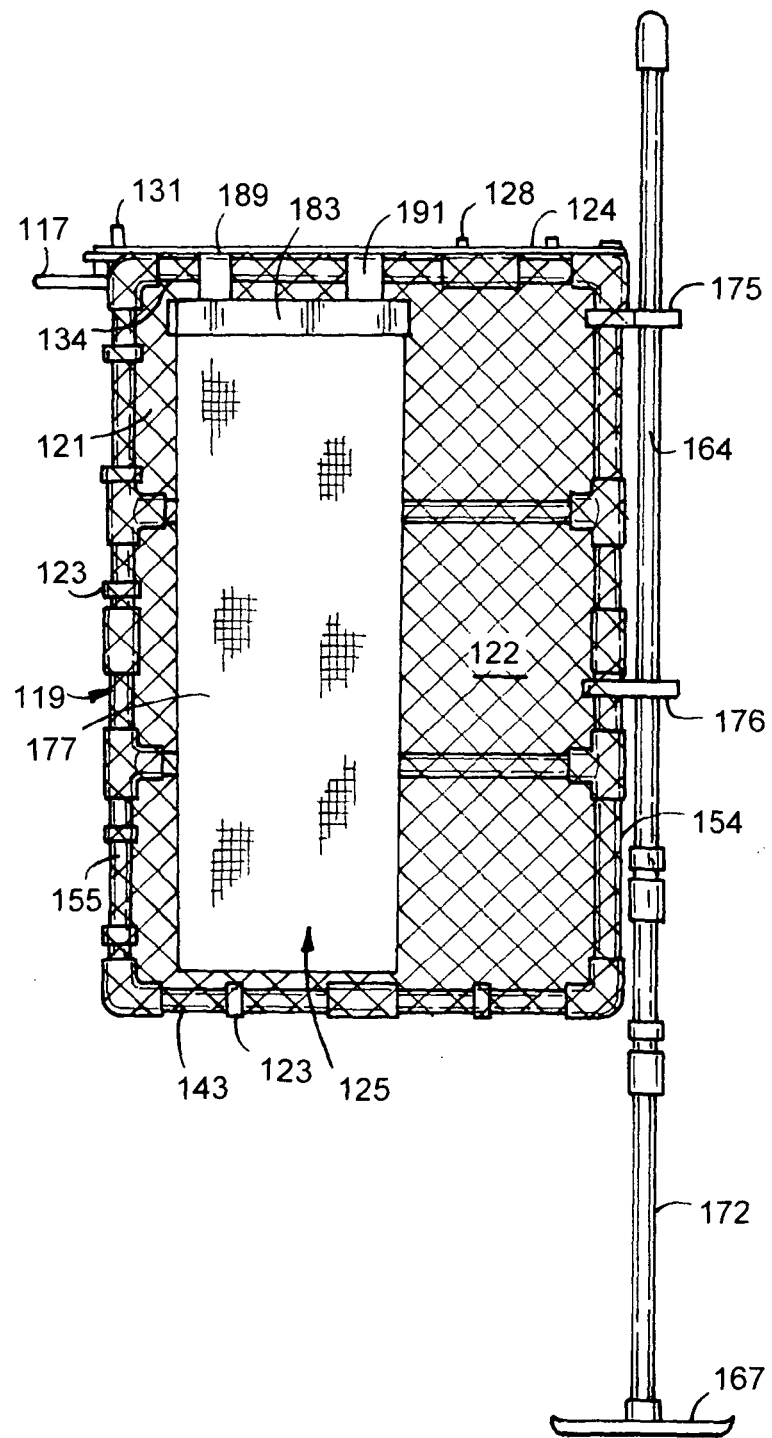
FIG. 12 is an enlarged sectional view taken along line 12-12 of FIG. 10.
Figure 16:
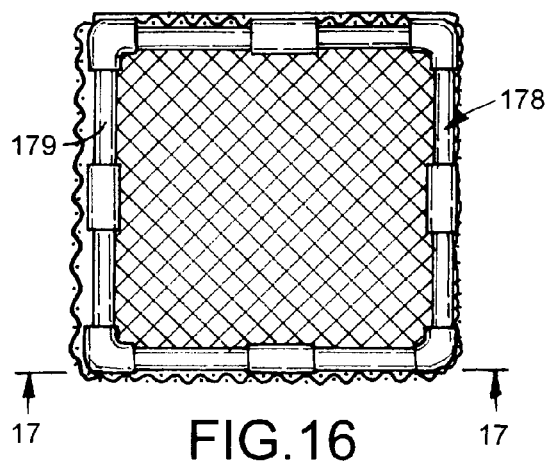
FIG. 16 is an enlarged top plan view of the frame assembly and bag of the minnow cage.
Figure 17:
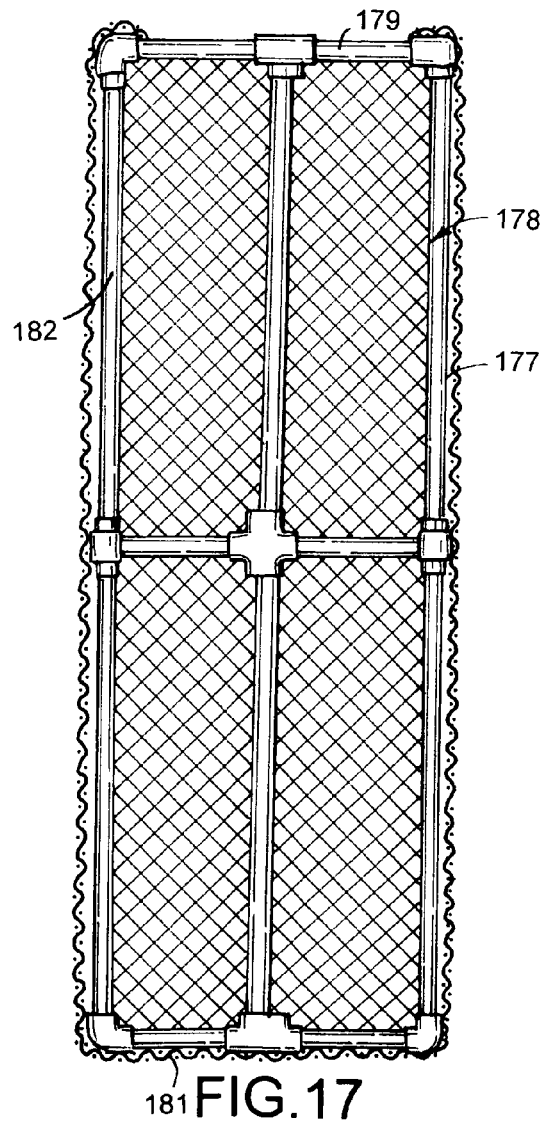
FIG. 17 is a sectional view taken along line 17-17 of FIG. 16.

As shown in FIGS. 9, 11 and 12, fish live box 100 has a generally rectangular box frame assembly 119 supporting an open mesh screen 121. Screen 121 attached to frame assembly 119 with loop fasteners or ties 123 surrounds an internal chamber 122. The top of chamber 122 is open to provide access to the water in chamber 122 and fish therein. The open top of chamber 122 is surrounded with an upper frame member 132. A flat top wall or plate 124 mounted on member 132 partly closes the open top of chamber 122. A door 126 connected with a hinge 128 to wall 124 closes the remainder of the open top of chamber 122. A handle 131 secured to door remote from hinge 128 is manually used to pivot door 126 between open and closed positions.

A minnow cage 125 is located in chamber 122 to accommodate bait fish and other aquatic creatures. Cage 125 extends downwardly below door 122b to adjacent the bottom of fish live box 100. A pair of connectors or brackets 189 and 191 secure cage 125 to a front corner of frame assembly 119. Additional brackets can be used to secure a side and end of cage to adjacent frame structure of frame assembly 119.

As shown in FIGS. 9, 11 and 12, frame assembly 119 has tubular members secured together with T, cross and elbow connectors as described herein with reference to FIG. 5. The top frame member 132 is connected to bottom frame member 143 with upright side frame members 154 and 155. Screen 121 surrounds the sides and bottom of frame assembly 119. Screen 121 is a plastic mesh sheet member. Other types of screen, such as fabric, nylon and wire screens and mesh sizes can be used to enclose frame assembly 119.

A pair of upright legs 163 and 164 attached to outside corners of frame assembly 119 support and stabilize the outside of frame assembly 119 on the bed or the bottom of the body of water. The lower end of legs 163 and 164 are secured to generally flat pads or feet 166 and 167 that rest on the bed. Pads 166 and 167 limit the sinking of legs 163 and 164 into the bed and thereby maintain the level orientation of fish live box 100 and fish cage 125 relative to dock 111. The upper ends of legs 163 and 164 have inwardly directed arms 168 and 169 that provide stops for door 126 in its open position and hand grips for placing and removing fish live box 100 in and from the water adjacent dock 111. Legs 163 and 164 have lower extensions 171 and 172 to compensate for the depth of the water adjacent dock 111. Extensions 171 and 172 are adjustable to allow pads 166 and 167 to firmly engage the bed and support the outside of fish live box 100. Clamps 173, 175 and 176 allow legs 163 and 164 to be vertically adjusted. An example of a clamp is shown in FIG. 8 and described herein. Other types of connectors and clamps can be used to secure legs 163 and 164 to frame assembly 119.

Minnow cage 125, shown in FIGS. 13 to 17, comprises a mesh bag 177 having a top opening surrounding a cage frame 178. Bag 177 is a screen member having a small mesh to retain small fish and aquatic creatures within the bag. Fabric, nylon, plastic and metal screens can be used for bag 177. Cage frame 178 has interconnected top 179, bottom 181 and side 182 members. The members 179, 181 and 182 are plastic tubes connected with T, cross and elbow connectors. Mesh bag 177 is located around the sides and bottom of cage frame 178 and secured to cage top member 179. The top opening of bag 177 is closed with a removable cover 183. A live hinge 184 secures one end of cover 183 to frame member 179 to allow cover 183 to swing open providing access to the interior of bag 177 and fish therein. One or more fasteners 186 secure live hinge 184 to cage frame member 179. Cover 183 has a continuous top and downwardly extended side flanges or lips 187. Releasable fasteners 188, such as hook and loop fasteners, secure flanges 187 to frame member 179 to retain cover in a closed position. Other types of fasteners and connectors can be used to attach cover to frame member 179.

The fish live box has been described with reference to preferred embodiments. Changes in the shape, materials and arrangement of parts can be made by persons skilled in the art without departing from the invention.

The invention claimed is:

1. The combination of a dock extended above a body of water and a box for holding live fish comprising:
a dock located above a body of water,
a box having a chamber for accommodating water of the body of water and fish,
at least one bracket connecting the box to the dock,
at least one upright leg connected to the box, said leg having a lower end extended downwardly into the water and engageable with the bottom of the body of water to support the box adjacent the dock on the bottom of the body of water,
a fish bait cage located in the chamber of the box, and
at least one fastener attaching the cage to the box.

2. The combination of claim 1 wherein: the box includes:
a frame assembly having frame members,
a mesh screen located adjacent the frame members surrounding the chamber for water accommodating fish, and
fasteners connecting the screen to the frame members.

3. The combination of claim 1 including:
a top wall connected to the frame members,
a door, and
a hinge pivotally connecting the door to the top wall whereby the door can swing between open and closed positions relative to the frame assembly.

4. The combination of claim 1 including:
a pad connected to the lower end of the at least one leg adapted to rest on the bottom of the body of water thereby supporting the box on the bottom of the body of water.

5. The combination of claim 1 including:
a clamp connecting the at least one leg to the box, said clamp allowing the at least one leg to be vertically adjustable relative to the box to accommodate the depth of the water adjacent the deck.

6. The combination of claim 1 wherein:
the at least one upright leg comprises a pair of upright legs located adjacent the frame assembly, said legs having lower ends extended downwardly into the water adjacent the dock to the bottom of the body of water to support the frame assembly and screen attached to the frame assembly on the body of water, and
clamps connecting the frame assembly to the legs.

7. The combination of claim 6 including:
generally flat pads connected to the lower ends of the legs adapted to rest on the bottom of the body of water thereby supporting the frame assembly and the screen attached to the frame assembly on the bottom of the body of water.

8. The combination of claim 1 wherein:
said at least one bracket includes a releasable connector for attaching the box to the dock and allowing the box and at least one leg to be removed from the dock without altering the box or at least one leg.

9. The combination of claim 1 wherein:
the cage comprises
a bag having a top opening,
a cage frame surrounded by the bag, and
said at least one fastener attaching the cage frame to the box.

10. The combination of claim 9 including:
a cover for selectively closing and opening the top opening of the bag.

11. The combination of claim 10 including:
a hinge connecting the cover to the cage frame whereby the cover is movable between open and closed positions relative to the top opening of the bag.

12. The combination of a dock, a box for holding live fish and a fish bait cage adapted to be attached to a dock extended over a body of water comprising:
a dock extended over a body of water,
a box having a chamber for accommodating water of the body of water and fish,
at least one bracket attached to the box connected to the dock for securing the box to the dock,
at least one upright leg connected to the box, said at least one leg having a lower end extendable downwardly into the water and engageable with the bottom of the body of water to support the box on the bottom of the body of water,
a fish bait cage located in the chamber of the box,
the cage comprising
a bag having a top opening,
a cage frame surrounded by the bag,
a cover for selectively closing and opening the top opening of the bag, and at least one fastener attaching the cage frame to the box.

13. The combination of claim 12 including;
a hinge connecting the cover to the cage frame whereby the cover is movable between open and closed positions relative to the top opening of the bag.

14. The combination of a dock extended above a body of water and a box for holding live fish comprising:
a dock having a deck located above a body of water,
a box having a chamber for holding live fish,
said box comprising
a frame assembly having a first side member and a second side member opposite the first side member,
a mesh screen located around the frame assembly surrounding the chamber for water accommodating fish,
a door movably connected to the frame assembly for movement between open and closed positions relative to the frame assembly,
fasteners connecting the screen to the frame assembly,
brackets connected to the first side member of the frame assembly attachable to the dock for securing the frame assembly to the dock, each of the brackets having a member adapted to be secured to the deck, and a releasable connector joining the member to the first side member whereby the box can be attached to the dock and removed from the dock without altering the box,
at least one upright leg located adjacent the frame assembly, said at least one leg having a lower extension extended downwardly below the frame assembly into the water adjacent the dock to the bottom of the body of water adapted to support the frame assembly and screen attached to the frame assembly on the bottom of the body of water,
said at least one leg also having an inwardly directed arm providing a stop for the door in the open position and a handle to facilitate placement and removal of the box into and out of a body of water, and
a clamp connecting the at least one leg to the second side member of the frame assembly, said clamp allowing the leg to be vertically adjusted relative to the frame assembly to accommodate the depth of the body of water adjacent the dock.

15. The combination of claim 14 including:
a generally flat pad connected to the lower end of the at least one leg adapted to rest on the bottom of the body of water thereby supporting the frame assembly and screen on the bottom of the body of water.

16. The combination of claim 14 wherein:
the at least one leg comprises a pair of upright legs located adjacent the second side member of the frame assembly, said legs having lower extensions extended downwardly below the frame assembly into the water adjacent the dock to the bottom of the body of water to support the frame assembly and screen attached to the frame assembly on the body of water, and
clamps connecting the second side member of the frame assembly to the legs.

17. The combination of claim 16 including:
generally flat pads connected to the lower extensions of the legs adapted to rest on the bottom of the body of water thereby supporting the frame assembly and screen attached to the frame assembly on the bottom of the body of water.

18. The combination of claim 14 including:
a fish bait cage located in the chamber of the box, and
at least one fastener attaching the cage to the frame assembly of the box.

19. The combination of claim 18 wherein:
the cage comprises
a bag having a top opening,
a cage frame surrounded by the bag,
a cover for selectively closing and opening the top opening of the bag, and
said at least one fastener attaching the cage frame to the frame assembly of the box.

20. The combination of claim 19 including:
a hinge connecting the cover to the cage frame whereby the cover is movable between open and closed positions relative to the top opening of the bag.

21. The combination of a dock extended above a body of water and a box for holding live fish comprising:
a dock having a deck located above a body of water,
a box having a chamber for holding live fish,
said box comprising
a frame assembly having a first side, a second side opposite the first side, end and bottom frame members,
a mesh screen located adjacent the first and second sides, end and bottom frame members surrounding the chamber for water accommodating fish,
fasteners connecting the screen to the first and second sides, end, and bottom frame members,
a top wall mounted on the first and second sides, and end frame members,
a door,
a hinge pivotally connecting the door to the top wall whereby the door can swing between open and closed positions relative to the frame assembly and chamber,
brackets connected to the first side frame member attach to the dock for securing the frame assembly to the dock, each of the brackets has a base accommodating fasteners adapted to mount the base on the dock, a lip joined to the base extended around the first side frame member, and a removable pin associated with the lip to retain the position of the first side frame member under the lip,
upright legs located adjacent the second side frame member of the frame assembly, said legs having lower extensions extended downwardly below the bottom frame member into the water adjacent the dock to the bottom of the body of water to support the frame assembly and screen attached to the frame assembly on the bottom of the body of water, said legs also having inwardly directed arms providing stops for the door in the open position and handles to facilitate placement and removal of the box into and out of a body of water, and clamps connecting the legs to the second side frame member of the frame assembly and allowing the legs to be vertically adjusted relative to the frame assembly to accommodate the depth of the body of water adjacent the dock.

22. The combination of claim 21 wherein:

the frame assembly has horizontal and vertical side and end frame members, and connectors joining the horizontal and vertical frame members.

23. The combination of claim 22 herein:

the fasteners are loop ties connecting the screen to horizontal and vertical frame members.

24. The combination of claim 22 wherein:

the horizontal and vertical frame members comprise linear plastic tubes.

25. The combination of claim 21 including:

generally flat pads connected to the lower extensions of the legs adapted to rest on the bottom of the body of water thereby supporting the frame assembly and mesh screen attached to the frame assembly.

26. The combination of claim 21 wherein:

said legs comprises a pair of upright legs, each of said legs being located adjacent a second side frame member.

27. The combination of claim 21 including:

a minnow cage located in the chamber of the box below the door, and fasteners attaching the minnow cage to the frame assembly of the box.

28. The combination of claim 27 wherein:

the minnow cage comprises a bag having a top opening, a cage frame surrounded by the bag, a cover for selectively closing and opening the top opening of the bag, and said fasteners attaching the cage frame to the frame assembly of the box.

29. The combination of claim 28 including:

a hinge connecting the cover to the cage frame whereby the cover is movable between open and closed positions relative to the top opening of the bag.

\* \* \* \* \*